(12) United States Patent
Clark et al.

(10) Patent No.: US 6,489,407 B1
(45) Date of Patent: Dec. 3, 2002

(54) SILICONE COATINGS CONTAINING SILICONE MIST SUPPRESSANT COMPOSITIONS

(75) Inventors: Joseph Norbert Clark, Freeland, MI (US); Robert Alan Ekeland, Midland, MI (US); Michael Sean Owens, Midland, MI (US); Paul Cornelius Van Dort, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/599,689

(22) Filed: Jun. 22, 2000

(51) Int. Cl.$^7$ ................................................ C08G 77/12
(52) U.S. Cl. ........................... 525/478; 528/15; 528/32; 528/33; 528/31; 528/20
(58) Field of Search ......................... 525/478; 528/15, 528/32, 33, 31, 20

(56) References Cited

U.S. PATENT DOCUMENTS

| | | | |
|---|---|---|---|
| 4,465,818 A | 8/1984 | Shirahata et al. | 528/12 |
| 5,036,117 A | 7/1991 | Chung et al. | 522/172 |
| 5,125,998 A | 6/1992 | Jones et al. | 156/273.3 |
| 5,281,656 A | 1/1994 | Thayer et al. | 524/601 |
| 5,292,586 A | * 3/1994 | Lin et al. | |
| 5,548,038 A | 8/1996 | Enami et al. | 525/478 |
| 5,625,023 A | 4/1997 | Chung et al. | 528/29 |
| 5,698,655 A | 12/1997 | Chung et al. | 528/29 |
| 5,994,454 A | 11/1999 | Chung et al. | 524/731 |

\* cited by examiner

*Primary Examiner*—Robert Dawson
*Assistant Examiner*—Kuo-Liang Peng
(74) *Attorney, Agent, or Firm*—Timothy J. Troy; Patricia M. Scaduto

(57) ABSTRACT

This invention relates to silicone coating composition comprising a solventless silicone coating composition and a liquid silicone mist suppressant composition obtained by a method comprising reacting a large excess of at least one organohydrogensilicon compound containing at least three silicon-bonded hydrogen groups with at least one compound containing at least two alkenyl groups in the presence of a platinum group metal-containing catalyst.

52 Claims, No Drawings

US 6,489,407 B1

SILICONE COATINGS CONTAINING SILICONE MIST SUPPRESSANT COMPOSITIONS

BACKGROUND OF THE INVENTION

During the process of coating silicone on to paper for release coating applications, the formation of silicone mist (i.e. aerosol) is undesirable. Small mist particles, on the order of 1 to 10 microns are considered to be capable of being inhaled and can be deposited deep within the lungs. Silicone mist can also cause hygiene problems by coating everything in the vicinity of the coating head with a layer of silicone.

Solventless silicone coatings have been disclosed in the art. For example, Chung et al. in U.S. Pat. No. 5,036,117 discloses a curable composition comprising (A) an organosilicon compound having an average of at least two curing radicals per molecule thereof selected from the group consisting of the hydroxy radical and olefinic hydrocarbon radicals, (B) an organohydrogensilicon compound containing an average of at least two silicon-bonded hydrogen atoms per molecule thereof, the amounts of Components (A) and (B) being sufficient to provide a ratio of the number of silicon-bonded hydrogen atoms to the number of silicon-bonded curing radicals of from 1/100 to 100/1, (C) a platinum group metal-containing catalyst in sufficient amount to accelerate a curing reaction among said silicon-bonded curing radicals and said silicon-bonded hydrogen atoms, (D) an inhibitor compound for said accelerated curing reaction in a total amount sufficient to retard the curing reaction at room temperature but insufficient to prevent said reaction at elevated temperature, and (E) a bath life extender compound in a total amount sufficient to further retard the curing reaction at room temperature.

Jones et al. in U.S. Pat. No. 5,125,998 discloses a process, the process comprising the steps of (I) first mixing (A) an inhibitor compound and (B) a platinum group metal-containing catalyst, (II) thereafter adding the mixture of (I) to (C) an organosilicon compound having an average of at least two curing radicals per molecule thereof selected from the group consisting of the hydroxy radical and olefinic hydrocarbon radicals, (III) thereafter adding to the mixture of (II) (D) an organohydrogensilicon compound containing an average of at least two silicon-bonded hydrogen atoms per molecule thereof, the amounts of components (C) and (D) being sufficient to provide a ratio of the number of silicon-bonded hydrogen atoms to the number of silicon-bonded curing radicals of from 1/100 to 100/1; (IV) applying the mixture from (III) to a solid substrate to form a coating; (V) exposing the coating to an energy source selected from the group consisting of (i) heat, and (ii) actinic radiation in an amount sufficient to cure the coating; whereby the amount of component (A) present in the total composition of components (A), (B), (C), and (D), is sufficient to retard any curing reaction at room temperature but insufficient to prevent any reaction at elevated temperatures; and whereby the amount of component (B) is sufficient to accelerate any curing reaction among the silicon-bonded curing radicals and the silicon-bonded hydrogen atoms at elevated temperatures.

Thayer et al. in U.S. Pat. No. 5,281,656 discloses coating compositions comprising (A) an alkenyldiorganosiloxy-terminated polydiorganosiloxane, (B) an alkenyldiorganosiloxy-terminated polydiorganosiloxane-polyorganoalkenylsiloxane copolymer, (C) a hydrogendiorganosiloxy-terminated polydiorganosiloxane, (D) a platinum-containing catalyst, and (D) an inhibitor. Thayer et al. further discloses the amounts of Components (A), (B) and (C) that are used in the compositions, expressed in terms of the ratio of the number of silicon-bonded hydrogen atoms of Component (C) to the number of silicon-bonded alkenyl radicals of Components (A) and (B), are sufficient to provide a value of from 1/2 to 20/1 for said ratio and, preferably, from 1/2 to 2/1, and even more preferably, about 1/1.

Silicone compositions which are useful in suppressing silicone mist have also been described in the art. For example, Chung et al. in U.S. Pat. No. 5,625,023 discloses silicone mist suppressant compositions which are prepared by reacting an organosilicon compound, an oxyalkylene containing compound, and a catalyst. Chung et al. further discloses that these compositions, when added to silicone coatings, reduce the amount of silicone mist in high speed coating processes. These silicone mist suppressant compositions were only partially compatible with silicone and produced a cloudy mixture when added to coating formulations. This partial incompatibility was believed to be critical to the mist-suppression performance of these materials. However, the use of these suppressant also introduced new issues with the coverage and anchorage of the silicone release coating.

SUMMARY OF THE INVENTION

This invention relates to silicone coating composition comprising a solventless silicone coating composition and a liquid silicone mist suppressant composition obtained by a method comprising reacting a large excess of at least one organohydrogensilicon compound containing at least three silicon-bonded hydrogen groups with at least one compound containing at least two alkenyl groups in the presence of a platinum group metal-containing catalyst.

This invention also relates to a method of reducing mist in a solventless silicone coating which comprises adding to a solventless silicone coating a liquid silicone mist suppressant composition obtained by a method comprising reacting a large excess of at least one organohydrogensilicon compound containing at least three silicon-bonded hydrogen groups with at least one compound containing at least two alkenyl groups in the presence of a platinum group metal-containing catalyst.

The present invention also relates to the use of the silicone suppressant compositions in processes for preparing a laminate of a substrate and an adhesive wherein the adhesive will release from the substrate.

It is an object of this invention to provide a silicone composition which is capable of mist suppression in silicone coatings employed in high speed coating processes.

DETAILED DESCRIPTION OF THE INVENTION

In a first embodiment, this invention relates to a silicone coating composition comprising (A) a solventless silicone coating composition and (B) a liquid silicone mist suppressant composition having a viscosity of from 150 to 50,000 millipascal-seconds (mPa.s) (1 millipascal-second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1.

Component (A), the solventless silicone coating can be any of the well-known solventless hydrosilylation reaction based compositions known in the art. These solventless silicone coating compositions typically comprise (i) an organosilicon compound containing at least two silicon-bonded alkenyl groups per molecule, (ii) an organohydrogensilicon compound containing at least two silicon-bonded hydrogen atoms per molecule, (iii) a platinum group metal-containing catalyst, and (iv) an inhibitor.

The alkenyl groups of Component (i) are exemplified by vinyl, allyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl and 4,8-nonadienyl.

Component (i) is exemplified by triorganosiloxy-terminated polydiorganosiloxane-polyorganoalkenylsiloxane copolymers, alkenyldiorganosiloxy-terminated polydiorganosiloxane-polyorganoalkenylsiloxane copolymers, triorganosiloxy-terminated polydiorganosiloxane-polyorganoalkenylsiloxane copolymers, alkenyldiorganosiloxy-terminated polydiorganosiloxane-polyorganoalkenylsiloxane copolymers, triorganosiloxy-terminated polyorganoalkenylsiloxane polymers, and alkenyldiorganosiloxy-terminated polydiorganosiloxane polymers, each having a degree of polymerization of from 20 to 500, preferably from 50 to 300 and a viscosity at 25° C. of from 50 to 2,000 millipascal-seconds, and preferably from 80 to 1,000 millipascal-seconds. The organo substituent is exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. It is preferred that the organo substituent is methyl. The several organo substituents can be identical or different, as desired. The alkenyl substituent is exemplified by vinyl, allyl, 3-butenyl, 4-pentenyl, 5-hexenyl, cyclohexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl, with vinyl and 5-hexenyl being preferred.

Component (i) is preferably selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 50 to 300 and a viscosity at 25° C. of from 80 to 1,000 millipascal-seconds. Component (i) can also be a combination of two or more of the above described alkenyl siloxanes.

The organohydrogensilicon compound of Component (ii) is preferably free of aliphatic unsaturation and contains two, three, or more silicon atoms linked by divalent radicals, an average of from one to two silicon-bonded monovalent radicals per silicon atom and an average of at least two or more silicon-bonded hydrogen atoms per compound. The organohydrogensilicon compound is preferably an organohydrogensiloxane containing an average of three or more silicon-bonded hydrogen atoms such as, for example, 5, 10, 20, 40, 70, 100, and more. The organohydrogensiloxane compounds suitable as Component (ii) can be linear, branched, cyclic, resins, and combinations thereof.

Component (ii) is exemplified by diorganohydrogensiloxy-terminated polydiorganosiloxane polymers, diorganohydrogensiloxy-terminated polyorganohydrogensiloxane polymers, diorganohydrogensiloxy-terminated polydiorganosiloxane-polyorganohydrogensiloxane copolymers, triorganosiloxy-terminated polydiorganosiloxane-polyorganohydrogensiloxane copolymers, triorganosiloxy-terminated polyorganohydrogensiloxane polymers, each having a degree of polymerization of from 2 to 1,000, and preferably from 5 to 100 and a viscosity at 25° C. of from 1 to 10,000 millipascal-seconds, and preferably from 5 to 100 millipascal-seconds. The organo substituent on these siloxanes is exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. It is preferred that the organo substituent is methyl. The several organo substituents can be identical or different, as desired.

Thus Component (ii) is preferably selected from the group consisting of dimethylhydrogensiloxy-terminated polydimethylsiloxane polymers, dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 5 to 100 and a viscosity at 25° C. of from 5 to 100 millipascal-seconds. Component (ii) can also be a combination of two or more of the above described organohydrogensiloxanes.

The amount of Components (i) and (ii) that is used in the compositions of this invention, expressed in terms of the ratio of the number of silicon-bonded hydrogen atoms of Component (ii) to the number of silicon-bonded alkenyl groups of Component (i), should be sufficient to provide a ratio of from 0.5:1 to 4.5:1, preferably a ratio of from 0.5:1 to 3:1.

Component (iii) can be can be any platinum group metal-containing catalyst component. By platinum group it is meant herein ruthenium, rhodium, palladium, osmium, iridium and platinum and complexes thereof. Preferably Component (iii) is a platinum-containing catalyst. The platinum-containing catalyst can be platinum metal, platinum metal deposited on a carrier such as silica gel or powdered charcoal, or a compound or complex of a platinum group metal. Preferred platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane. Component (iii) is present in an amount sufficient to provide at least 10 weight parts, preferably 30 to 500 weight parts of platinum for every one million weight parts of Components (i)+(ii), and it is highly preferred that it is present in an amount sufficient to provide 30 to 250 weight parts of platinum for every one million parts by weight of Components (i)+(ii).

Component (iv), the inhibitor, can be any material that is known to be, or can be, used to inhibit the catalytic activity of platinum group metal-containing catalysts. By the term "inhibitor" it is meant herein a material that retards the room temperature curing of a mixture of Components (i), (ii), and (iii), and any optional components without preventing the elevated curing of the mixture. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors are exemplified by acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy) silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-(methoxyisopropyl)maleate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above.

The amount of inhibitor to be used in the solventless silicone coatings of this invention is not critical. It is preferred that from 0.1 to 10 parts by weight of inhibitor be used per 100 parts by weight of components (i)+(ii).

The solventless silicone coating compositions can further comprise (v) a bath life extender compound in a total amount sufficient to further retard the curing reaction at room temperature. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender (v) that is to be used can be as high as 10 parts or more by weight. Preferably, the amount of bath life extender to be used falls within the range of 0.01 to 5 parts, and most preferably 0.01 to 1 part by weight, per 100 weight parts of Components (i)+(ii).

The solventless silicone coating compositions can further comprise (vi) a release additive. Any of the well-known release additives in the art may be employed. The release additive is preferably a siloxane resin consisting essentially of $RSiO_{1/2}$ units and $SiO_{4/2}$ units wherein R is independently an alkenyl group as delineated hereinabove or an organo substituent and wherein the molar ratio of $RSiO_{1/2}$ units to $SiO_{4/2}$ is from 0.6:1 to 4:1, preferably from 0.6:1 to 1.9:1, and most preferably from 1.2:1 to 1.6:1. The organo substituent on the siloxane resin is exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. It is preferred that the organo substituent is methyl. The several organo substituents can be identical or different, as desired. The siloxane resin can further be diluted with an organoalkenylsiloxane such as those described above (for example, vinyl or hexenyl containing polydiorganosiloxane polymers or copolymers. The high release additive preferably comprises 40 to 70 weight parts of the vinyl functional MQ resin and 30 to 60 weight parts of the organoalkenylsiloxane polymer. From 1 to 99 weight parts of the high release additive may be employed in the solventless silicone release coating (A) of this invention, and preferably 1 to 10 weight parts of high release additive is employed, per 100 weight parts of Components (i)+(ii).

The solventless silicone coating composition (A) can further comprise any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, and adhesive-release modifiers.

Components (i)–(iv), and any optional components can be mixed together using any suitable mixing means, such as a spatula, a drum roller, a mechanical stirrer, a three roll mill, a sigma blade mixer, a bread dough mixer, and a two roll mill. The solventless silicone release coating can be prepared by homogeneously mixing Components (i), (ii), (iii), (iv), and any optional components in any order. The order of mixing Components (i)–(iv) and any optional components is not critical however it is preferred that Component (iii), the platinum group metal-containing catalyst, be brought together in the presence of Components (i), (ii), (iv), and any optional components. It is highly preferred to mix Components (i), (ii), (iv), and any optional components in a preliminary mixing step followed by addition of catalyst (iii). Components (i)–(iv) and any optional components can be mixed at room temperature (20–25° C.) or can be heated to temperatures above room temperature such as at temperatures of up to 200° C., however it is preferred that if ingredients (i)–(iv) and any optional components are heated, they are heated to a temperature of from 50° C. to 120° C.

Component (A) can also be any of the radiation curable silicone coating compositions known in the art such as UV (ultraviolet) or EB (electron beam) curable silicone coatings. These radiation curable silicone coating composition generally comprise (i) an organosilicon compound having at least two groups selected from the group consisting of epoxy groups, vinyl ether groups, acrylamide groups, and acrylate groups; and (ii) an initiator. Preferably the organosilicon compound (i) is selected from the group consisting of vinylether-containing polyorganosiloxanes and epoxy-containing organopolysiloxanes.

The vinylether-containing organopolysiloxanes are exemplified by trimethylsiloxy-terminated polydimethylsiloxane-polymethylvinylethersiloxane copolymers, vinyletherdimethylsiloxy-terminated polydimethylsiloxane-polymethylvinylethersiloxane copolymers, trimethylsiloxy-terminated polymethylvinylethersiloxane polymers, and vinyletherdimethylsiloxy-terminated polydimethylsiloxane polymers wherein the vinylether group is selected from the group consisting of —Q(OQ)$_c$OCH=CH$_2$ and —QSi(OQOCH=CH2)$_{3-m}$R$_m$ wherein Q is an alkylene group, c has a value of 0 to 10, m has a value of 0 to 2, and R is a monovalent hydrocarbon group and wherein the vinylether-containing organopolysiloxane has a degree of polymerization of from 3 to 700, and preferably from 5 to 300 and a viscosity at 25° C. of from 5 to 25,000 millipascal-seconds, and preferably from 5 to 1500 millipascal-seconds. Component (i) in the radiation curable silicone coating can also be a combination of two or more of the above-described vinylether-containing organopolysiloxanes. In the above formula, Q is independently an alkylene group exemplified by methylene, ethylene, propylene, butylene, phenylene, trimethylene, 2-methyltrimethylene, pentamethylene, hexamethylene, 3-ethylhexamethylene, octamethylene, decamethylene, dodecamethylene, tetradecamethylene, and octadecamethylene, cyclohexylene, phenylene, and benzylene, and R is exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. Preferably c and m have a value of 0.

The epoxy-containing organopolysiloxane can be any organopolysiloxane which contains at least two epoxy groups. The epoxy-containing organopolysiloxanes are exemplified by trimethylsiloxy-terminated polydimethylsiloxane-polymethylepoxysiloxane copolymers, epoxydimethylsiloxy-terminated polydimethylsiloxane-polymethylepoxysiloxane copolymers, trimethylsiloxy-terminated polymethylepoxysiloxane polymers, and epoxydimethylsiloxy-terminated polydimethylsiloxane polymers wherein the epoxy group is exemplified by 1,2-epoxyethyl, 2,3-epoxypropyl, 3,4-epoxybutyl, 5,6-epoxyhexyl, 9,10-epoxydecyl, glycidoxymethyl, alpha-glycidoxyethyl, beta-glycidoxyethyl, alpha-glycidoxypropyl, beta-glycidoxypropyl, gamma-glycidoxypropyl, 2-(3,4-epoxycyclohexyl)ethyl, 3-(3,4-epoxycyclohexyl)propyl, and 3,4-epoxycyclohexylbutyl wherein the epoxy-containing organopolysiloxane has a degree of polymerization of from 3 to 700, and preferably from 5 to 300 and a viscosity at 25° C. of from 5 to 25,000 millipascal-seconds, and preferably from 5 to 1500 millipascal-seconds. Component (i) in the radiation curable silicone coating can also be a combination of two or more of the above-described epoxy-containing organopolysiloxanes.

It is preferred that from 95 to 99.5 weight percent of the radiation curable organosilicon compound (i) be used in the radiation curable coating compositions of the invention, and it is highly preferred that from 97 to 99 weight percent of this compound be employed, said weight percent being based on the total weight of the radiation curable silicone coating composition.

Compounds suitable as the initiator (ii) include photoinitiators and sensitizers. Sensitizers have been described in great detail in the art in numerous publications and include materials such as the well-known material benzophenone. The photoinitiators are exemplified by onium salts, diaryliodonium salts of sulfonic acids, triarylsulfonium salts of sulfonic acids, diaryliodonium salts of boronic acids, and triarylsulfonium salts of boronic acids.

Preferred onium salts are bis-diaryl iodonium salts such as bis(dodecyl phenyl) iodonium hexafluoroarsenate and bis(dodecylphenyl) iodonium hexafluoroantimonate, and dialkylphenyl iodonium hexafluoroantimonate.

Preferred diaryliodonium salts of sulfonic acid are selected from diaryliodonium salts of perfluoroalkylsulfonic acids and diaryliodonium salts of aryl sulfonic acids. Preferred diaryliodonium salts of perfluoroalkylsulfonic acids include diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid. Preferred diaryliodonium salts of aryl sulfonic acids include diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are selected from triarylsulfonium salts of perfluoroalkylsulfonic acids or triarylsulfonium salts of aryl sulfonic acids. Preferred triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids include triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids include diaryliodonium salts of perhaloarylboronic acids and preferred triarylsulfonium salts of boronic acids are the triarylsulfonium salts of perhaloarylboronic acid.

The initiators (ii) may be present in any proportions which effect curing in the compositions of this invention. Preferably the amount of initiator is from 0.1 to 10 weight percent based on the total weight of the composition, and it is highly preferred to use between 1 and 5 weight percent based on the total weight of the radiation curable silicone coating composition.

The radiation curable silicone coatings can further contain optional ingredients such as photosensitizers, fillers, high release additives, reactive diluents such as organic vinyl ethers, photochromic materials, dyes, colorants, preservatives, fragrances, and other radiation curable compounds may be included in the composition. Preferably no more than 25 parts by weight of the composition is occupied by optional ingredients.

Component (B) is a liquid silicone mist suppressant composition having a viscosity of from 150 to 50,000 millipascal-seconds (1 millipascal second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum per million weight parts of (a)+(b), with the proviso that the ratio of the number of silicon-bonded hydrogen atoms of Component (a) to the number of alkenyl groups of Component (b) is at least 4.6:1.

The organohydrogensilicon compound (a) is preferably free of aliphatic unsaturation and contains three or more silicon atoms linked by divalent radicals, an average of from one to two silicon-bonded monovalent radicals per silicon atom and an average of at least three or more silicon-bonded hydrogen atoms per compound. The organohydrogensilicon compound is preferably an organohydrogensiloxane containing an average of three or more silicon-bonded hydrogen atoms such as, for example, 5, 10, 20, 40, 70, 100, and more. The organohydrogensiloxane compounds suitable as Component (a) can be linear, branched, cyclic, resins, and combinations thereof.

Component (a) is exemplified by diorganohydrogensiloxy-terminated polyorganohydrogensiloxane polymers, diorganohydrogensiloxy-terminated polydiorganosiloxane-polyorganohydrogensiloxane copolymers, triorganosiloxy-terminated polydiorganosiloxane-polyorganohydrogensiloxane copolymers, triorganosiloxy-terminated polyorganohydrogensiloxane polymers, each having a degree of polymerization of from 3 to 300, and preferably from 3 to 100, and a viscosity at 25° C. of from 1 to 1,000 millipascal-seconds, and preferably from 1 to 200 millipascal-seconds. The organo substituent on these siloxanes is exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. It is preferred that the organo substituent is methyl. The several organo substituents can be identical or different, as desired.

Thus Component (a) is preferably selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds. Component (a) can also be a combination of two or more of the above described organohydrogensiloxanes.

The alkenyl groups of Component (b) are exemplified by vinyl, allyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl and 4,8-nonadienyl.

Component (b) can be organic compounds which contain at least two alkenyl groups such as dienes exemplified by 1,3 hexadiene, 1,5 hexadiene, 1,4 hexadiene, 2,4 hexadiene, propadiene, 1,3-butadiene, 1,3-pentadiene, 1,4-pentadiene, 1,6-heptadiene, 1,7-octadiene, and 1,9-decadiene.

Component (b) can also be an alkenyl siloxane which is exemplified by divinyltetramethyldisiloxane, tetramethyltetravinylcyclotetrasiloxane, triorganosiloxy-terminated polydiorganosiloxane-polyorganoalkenylsiloxane copolymers, alkenyldiorganosiloxy-terminated polydiorganosiloxane-polyorganoalkenylsiloxane copolymers, triorganosiloxy-terminated polydiorganosiloxane-polyorganoalkenylsiloxane copolymers, alkenyldiorganosiloxy-terminated polydiorganosiloxane-polyorganoalkenylsiloxane copolymers, triorganosiloxy-terminated polyorganoalkenylsiloxane polymers, and alkenyldiorganosiloxy-terminated polydiorganosiloxane polymers, each having a degree of polymerization of from 2 to 10,000, and preferably from 2 to 1000, and a viscosity at 25° C. of from 0.5 to 500,000 millipascal-seconds, and preferably from 0.5 to 10,000 millipascal-seconds. The organo substituent is as defined above including preferred embodiments thereof. The alkenyl substituent is exemplified by vinyl, allyl, 3-butenyl, 4-pentenyl, 5-hexenyl, cyclohexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl, with vinyl and 5-hexenyl being preferred.

Thus Component (b) is preferably selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds. Component (b) can also be a combination of two or more of the above described alkenyl siloxanes.

The amount of Components (a) and (b) that is used in the compositions of this invention, expressed in terms of the ratio of the number of silicon-bonded hydrogen atoms of Component (a) to the number of alkenyl groups of Component (b), should be sufficient to provide a ratio of at least 4.6:1, and preferably from 4.6:1 to 500:1. The ratio of the number of silicon-bonded hydrogen atoms of Component (a) to the number of alkenyl groups of Component (b) (i.e. SiH:Vi ratio wherein Vi denotes —C=C—) depends on factors such as the type, amount, viscosity, and degree of polymerization of Component (a) and the type, amount, viscosity, and degree of polymerization of Component (b). Some typical SiH:Vi ratios include about 4.7:1 to about 10:1, about 15:1 to about 25:1, about 30:1 to about 41:1, about 60:1 to about 65:1, about 80:1 to about 90:1, about 155:1 to about 165:1, about 215:1 to about 225:1, and as high as about 12,000:1 to 13,000:1. However, for the silicone mist suppressant compositions of this invention, the SiH:Vi ratio is preferably from 4.6:1 to 100:1.

Component (c) can be any platinum group metal-containing catalyst component. By platinum group it is meant herein ruthenium, rhodium, palladium, osmium, iridium and platinum and complexes thereof. Preferably Component (c) is a platinum-containing catalyst. The platinum-containing catalyst can be platinum metal, platinum metal deposited on a carrier such as silica gel or powdered charcoal, or a compound or complex of a platinum group metal. Preferred platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane. Preferably the catalyst (c) is added at an amount sufficient to provide 0.1 to 10 weight parts of platinum for every one million weight parts of (a)+(b), and it is highly preferred that the amount is sufficient to provide 0.1 to 5 weight parts of platinum for every one million parts by weight of (a)+(b).

The method of obtaining the silicone mist suppressant composition can further comprise adding (d) an inhibitor during or after mixing components (a), (b), and (c). Component (d), the inhibitor, can be any material that is known to be, or can be, used to inhibit the catalytic activity of platinum group metal-containing catalysts. By the term "inhibitor" it is meant herein a material that retards the room temperature curing of a mixture of Components (a), (b), and (c), and any optional component when incorporated therein in small amounts, such as less than 10 parts by weight of the composition, without preventing the elevated curing of the mixture. Examples of suitable inhibitors include ethylenically or aromatically unsaturated amides, acetylenic compounds, silylated acetylenic compounds, ethylenically unsaturated isocyanates, olefinic siloxanes, unsaturated hydrocarbon diesters, conjugated ene-ynes, hydroperoxides, nitrites, and diaziridines.

Preferred inhibitors are exemplified by acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy) silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis-(methoxyisopropyl) maleate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, and a mixture of a conjugated ene-yne as described above and a vinylcyclosiloxane as described above. Preferably, inhibitor (d) is added after mixing (a), (b), and (c).

The amount of inhibitor (d) to be used in the silicone mist suppressant compositions of this invention is not critical. It is preferred that from 0.01 to 10 parts by weight of inhibitor be used per 100 parts by weight of component (a+b).

The method of obtaining the silicone mist suppressant composition further can further comprise adding (e) at least one compound containing one alkenyl group during or after mixing components (a), (b), (c), and optionally (d). The compound of Component (e) can only contain a single alkenyl group. Component (e) is exemplified by vinyl aromatic monomers, polyoxyalkylene polymers, epoxy compounds, vinyl ether compounds, acrylamide compounds, acrylate compounds, isocyanate compounds, and alpha-olefins.

The vinyl aromatic monomers are exemplified by styrene and alpha-methyl styrene. The polyoxyalkylene polymers exemplified by alkenyl-terminated polyoxyethylene polymers, alkenyl-terminated polyoxypropylene polymers, and alkenyl-terminated polyoxyalkylene copolymers exemplified by alkenyl-terminated polyoxyethylene-polyoxypropylene copolymers and alkenyl-terminated polyoxyethylene-polyoxybutylene copolymers. The epoxy compounds are exemplified by vinyl or allyl functional epoxides such as 1,2-epoxy-5-hexene, 3,4-epoxy-1-butene, 5,6-epoxy-1-hexene, 7,8-epoxy-1-octene, 11,12-epoxy-1-dodecene, allyl glycidyl ether, 1-methyl-4-isopropenyl cyclohexeneoxide, 1,4-dimethyl-4-vinylcyclohexeneoxide, and 2,6-dimethyl-2,3-epoxy-7-octene. The vinyl ether compounds are exemplified by hydroxybutylvinylether, hydroxypropylvinylether, p-phenolvinylether, hydroxybutyl-2-methylvinylether, or $H(O(CH_2)_2)_3OCH=CH_2$. The isocyanate compounds are exemplified by allyl isocyanate. The alpha-olefins exemplified by include straight-chain alpha-olefins having from 2 to 20 carbon atoms such as ethylene, propylene, 1-butene, 1-pentene, 1-hexene, 1-octene, 1-decene, 1-dodecene, 1-tetradecene, 1-hexadecene, 1-octadecene and 1-eicosene, and branched alpha-olefms having from 4 to 20 carbon atoms such as 4-methyl-1-pentene, 3-methyl-1-pentene and 3-methyl-1-butene. The straight chain or branched alpha-olefms can be used singly or in combination of two or more kinds. Preferably Component (e) is added after mixing components (a), (b), (c), and optionally (d).

The ingredients and any optional ingredients can be mixed at any temperature, however it is preferred that ingredients (a)–(c) and any optional ingredients are mixed at room temperature, or heated to a temperature of from 25° C. to 150° C.

Components (a)–(c), and any optional components can be mixed together using any suitable mixing means, such as a spatula, a drum roller, a mechanical stirrer, a three roll mill, a sigma blade mixer, a bread dough mixer, and a two roll mill. Components (a)–(c) can be prepared by homogeneously mixing (a), (b), (c), and any optional components in any order. The order of mixing (a) to (c) and any optional components is not critical however it is preferred that catalyst (c) be brought together in the presence of Components (a) and (b), and any optional components. It is highly preferred to mix Components (a) and (b) and any optional components in a preliminary mixing step followed by addition of catalyst (c). Mixing of Components (a), (b), and any optional compounds, and catalyst (c) results in the formation of a reaction product.

The silicone mist suppressant composition is present in the silicone coating composition in amount sufficient to reduce the mist (aerosol) of the coating during high-speed processes, which can readily be determined by one skilled in the art through routine experimentation. It is preferably added to the solventless silicone coating composition in an amount of 0.1 to 15 weight parts, and it is highly preferred that the silicone mist suppressant composition is added in an amount of 0.2 to 5 weight parts, said weight parts being based on 100 weight parts of the solventless silicone coating composition.

Component (B), the silicone mist suppressant is a complex mixture of highly branched methylhydrogensiloxane polymers or copolymers. A large excess of Component (a) is necessary to completely react the alkenyl groups of Component (b) without reaching a gel point. The product of this reaction is therefore different from silicone elastomer and gel compositions which react alkenyl siloxanes and organohydrogensiloxane with the purpose of reaching a gel point. The materials of the present invention must remain as fluids and must not reach a gel point. Depending on the structure of the starting materials, the viscosity of the final product preferably is from 300 to 15,000 millipascal-seconds.

In a second embodiment, this invention relates to a silicone coating composition comprising (A) at least one organosilicon compound containing at least two silicon-bonded alkenyl groups per molecule; (B) a liquid silicone mist suppressant composition having a viscosity of from 150 to 50,000 millipascal-seconds(mPa.s) (1 millipascal-second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1; and (C) an inhibitor. The organosilicon compound of Component (A), the liquid silicone mist suppressant of Component (B), and inhibitor (C) are as described above including preferred embodiments thereof. The silicone mist suppressant composition is generally present in an amount of 0.1 to 15 weight parts, and it is highly preferred that the silicone mist suppressant composition is present in an amount of 0.2 to 5 weight parts, said weight parts being based on 100 weight parts of Component (A). The amount of inhibitor to be used in the silicone coating compositions of this invention is preferably from 0.01 to 10 parts by weight of inhibitor be used per 100 parts by weight of Components (A+B).

In a third embodiment, this invention relates to a silicone coating composition comprising (A) an organohydrogensilicon compound containing at least two silicon-bonded hydrogen atoms per molecule and (B) a liquid silicone mist suppressant composition having a viscosity of from 150 to 50,000 millipascal-seconds(mPa.s) (1 millipascal-second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1. This silicone coating composition can optionally comprise (C) an inhibitor. The organohydrogensilicon compound of Component (A), the liquid silicone mist suppressant of Component (B), and inhibitor (C) are as described above including preferred embodiments thereof. The silicone mist suppressant composition is generally present in an amount of at least 10 weight parts, and it is highly preferred that the silicone mist suppressant composition is present in an amount of 10 to 1000 weight parts, said weight parts being based on 100 weight parts of Component (A). The amount of inhibitor to be used in the silicone coating compositions of this invention is preferably from 0.01 to 10 parts by weight of inhibitor be used per 100 parts by weight of Components (A+B).

In a fourth embodiment, this invention relates to a method of reducing mist in a silicone coating composition comprising adding to a solventless silicone coating composition a liquid silicone mist suppressant composition having a viscosity of from 150 to 50,000 millipascal-seconds (1 millipascal second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1. The solventless silicone coating composition and the liquid silicone mist suppressant composition are as described above including preferred embodiments and amounts thereof.

In a fifth embodiment, this invention relates to a method of making a cured coating, the method comprising the steps of: (I) adding a liquid silicone mist suppressant composition having a viscosity of from 150 to 50,000 millipascal-seconds (1 millipascal second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1 to a solventless silicone coating composition; (II) coating the mixture from (I) on the surface of a substrate; and (III) exposing the coating and the substrate to an energy source selected from the group consisting of (i) heat and (ii) actinic radiation in an amount sufficient to cure the coating. This method can further comprise applying a pressure sensitive adhesive on the coating after step (III). The solventless silicone coating composition and the liquid silicone mist suppressant composition are as described above including preferred embodiments and amounts thereof.

By actinic radiation it is meant ultraviolet light; electron beam radiation; and alpha-, beta-, gamma- and x-rays. By heat it is meant infrared radiation, hot air, microwave radiation, etc. Of course actinic radiation is frequently accompanied by heat and the use of a combination of the two falls within the scope and spirit of the present method. In the preferred method of this invention, the coating process can be accomplished by any suitable manner known in the art, such as by spreading, brushing, extruding, spraying, gravure, kiss-roll and air-knife.

In a preferred embodiment of the instant method the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the silicone coating composition has been coated onto a substrate it is heated and/or irradiated with actinic radiation, as noted herein, to cure the liquid coating and to adhere it to the substrate.

In a preferred embodiment of the method of this invention, a flexible sheet material, such as paper, metal foil or tapestock, is coated with a thin coating of the silicone coating composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The method of this invention is also applicable to adhesive materials, other than pressure sensitive adhesives. Examples of said adhesive materials include foods, graphite composites, asphalt and gum polymers.

The silicone mist suppressant compositions of this invention when added to silicone coatings are effective in reducing the amount of mist generated by the release coating during high speed coating processes such as for example when a silicone coating is coated onto a substrate such as paper, and the coating is then subsequently cured onto the substrate using heat to provide a sheetlike material bearing on at least surface thereof an adhesive releasing coating.

The following examples are disclosed to further teach, but not limit, the invention, which is properly delineated by the appended claims. All amounts (parts and percentages) are by weight unless otherwise indicated.

The silicone mist particles produced by the "mist generator" described hereinbelow were drawn, in some of the Examples, to a QCM Cascade Impactor™, (Model PC-2 Ten Stage QCM Cascade Impactor, California Measurements, Inc., Sierra Madre, Calif.) and analyzed. A complete analysis of aerosol mass concentration and size distribution was obtained from a sample of air taken for a short period of time (10 seconds to 1 minute). Collected samples of the sized particles were retained undisturbed (if the particles are solid) and were used directly to obtain composition, size and shape (for solid particles only) information using auxiliary scanning electron microscopy (SEM) and other analytical techniques.

The instrument separates aerosol particles into 10 sizes from 0.05 to 25 micrometers. It does this by drawing the aerosol-laden air sample through a series of 10 stages, each stage containing an inertial impactor jet of decreasing size (various size of orifices) where the particles are accelerated. Directly below each jet was a piezoelectric quartz crystal that was used as an impactor to collect the separated particles. As the jet of air exits from the nozzle it was forced to turn sharply to flow around the crystal. Larger particles in the stream, because of their inertia, continue to travel toward the crystal plate and impact on it. Smaller particles follow the flow of air around the crystal to the next stage, which was a repeat of the proceeding stage, except it was equipped with smaller nozzle designed to impact smaller particles. The 10 stages thus collect particles of smaller and smaller sizes. Each crystal was the frequency-controlling element of a quartz-crystal microbalance (QCM), whose output frequency decreases when particles are collected on the surface. Placed in close proximity to the sensing crystal, but shielded from the collected particles, was an identical reference crystal controlling the frequency of another circuit set about 2 kHz higher than that of the sensing crystal. The set of crystals in a stage were closely matched in frequency.

The beat frequency between the two oscillators was the signal indicative of the mass collected. The particle size distribution was obtained by monitoring the frequency change of QCM in each of the 10 stages.

A tip of stainless steel tube (¼' in diameter) remoted from the QCM Cascade Impactor (TM) was placed very closely to the nip point of the mist generator. To start the measurement the Cascade Impactor was initialized by pushing the initialization button on the front panel of the control unit. The mist generator was set at a speed (either 1,000, 1,500 or 2,000 ft/min) and allowed to run for 10 seconds before taking the sample and then open the sampling knob of the Impactor for a predetermined period time (10 to 30 seconds). After sampling the Impactor was left to idle for additional 50 seconds to let the particles settle in the stages. The amount of collected particles at each stage was calculated by pushing the "final" button on the front panel. The result of the total amount of mist and particle size distribution is printed out to both the CRT of the PC connected via the serial port and the thermal printer on the controller. The data was taken from at least average of three individual runs at a speed. When the individual data scattered too much two more measurements were made and then the two extreme values (1 highest and 1 lowest) were discarded before the results were averaged.

Tests were also conducted on a 12" forward roll coater. On a five roll 12 inch diameter production scale forward roll coater the QCM cascade impactor was installed to measure the amount of mist produced at 1,500 ft/min line speed. The tip of stainless steel tube (¼ inch id.) for sample collection was located at 1 inch away from the nip point of the applicator and nipping rollers of the coater. The coater was run for 10 seconds at 1,500 ft/min and then the mist sample was taken for additional 10 seconds. Two to three data points were taken at a condition and then the average was taken as a result. The average variations were less than 15% of the mean values.

EXAMPLES 1–7

In Examples 1–7 hereinbelow, a methylhydrogensiloxane (A) and an alkenyl siloxane (B) were thoroughly mixed at 25° C. Then, a catalyst (C) was added with thorough mixing at 25° C. The mixture was then brought to the desired reaction temperature and mixed at that temperature for a time sufficient for the viscosity to stabilize (reaction A). If desired, a vinyl functional organic compound or combination of vinyl functional organic compounds (D) was then added and the reaction mixture was heated for a sufficient time to completely react the vinyl functional organic compounds (reaction B). Upon completion of the reaction, an inhibitor (E) was added to inhibit the activity of the catalyst and stabilize the product. Table 1 summarizes the reagents used, reaction conditions, and viscosity of the final products. In Table 1 hereinbelow:

(A) denotes a trimethylsiloxy-terminated polydimethylsiloxane polymethylhydrogensiloxane copolymer having a total average degree of polymerization of about 10 with about 50 mol % methylhydrogen moiety on the siloxane chain and a viscosity of about 5 millipascal-seconds.

(B-1) denotes a dimethylvinylsiloxy-terminated polydimethylsiloxane polymer having an average degree of polymerization of about 130 and a viscosity of about 300 millipascal-seconds.

(B-2) denotes a dimethylvinylsiloxy-terminated polydimethylsiloxane polymer having an average degree of polymerization of about 5 and a viscosity of about 3 millipascal-seconds.

(B-3) denotes a dimethylvinylsiloxy-terminated polydimethylsiloxane-polymethylvinylsiloxane copolymer having a total average degree of polymerization of about 100 with about 1 mol % methylvinyl moiety on the siloxane chain and a viscosity of about 230 millipascal-seconds.

(B-4) denotes a dimethylvinylsiloxy-terminated polydimethylsiloxane-polymethylvinylsiloxane copolymer having a total average degree of polymerization of about 150 with about 2 mol % methylvinyl moiety on the siloxane chain and a viscosity of about 375 millipascal-seconds.

(C) denotes a soluble platinum complex containing 0.67 wt. % platinum, formed from chloroplatinic acid and divinyltetramethyldisiloxane.

(D-1) denotes 1-octadecene.

(D-2) denotes alpha-methylstyrene.

(E) denotes bis(2-methoxy-1-methylethyl) maleate.

Table 2 summarizes the mist-suppression performance of these materials.

(a) Coating line speed which corresponds to the rpm setting on the mist generator. The mist generator was a laboratory 2-roll coater capable of running at a line speed over 2,000 feet/minute. The 2-roll coater was equipped two 6 inch diameter rollers (bottom roll: rubber coated and top roll: chrome coated), two blades, one on each roll, and a bottom pan for containing the liquid supply. The rubber coated bottom roll was driven by variable speed motor which can cover over 2,000 ft/min. of line speed. The top roll was a nipping roll which is engaged with bottom roll by applying pressure. Since the measurement of mist is very sensitive to the environment the whole system was located in a hood and the hood fan speed was kept low to minimize the influence of turbulence of the hood to the measurement. A vacuum cleaner was attached to each roll surface by using a coat hanger type accessory to sweep the mist away once it passed the measuring point. The coating liquid was supplied either from the button pan or a dam on the top blade against the top metal roller. The bottom pan feeding method was employed for all data reported herein. To obtain consistent results, the pressure settings of top blade and top roller were kept at 10 and 50 psi, respectively and the bottom blade was used as a doctoring blade to regulate the amount of incoming fluid. The coater was made by Euclid Tool and Machines, Bay City, Mich.

(b) Measured using a Model 3225 Aerosizer DSP instrument, manufactured by TSI Corporation. The Aerosizer instrument is capable of measuring the total number of mist particles and particle size distribution in a sample of air drawn through the instrument at approximately 3 liters per minute for a set sample time. The sample time for all mist measurements in this document was 30 seconds.

In the Examples, the silicone mist suppressant prepared above was added to a silicone coating in the amount denoted in Table 2 below. The silicone coating was prepared by mixing the following ingredients: 95.5 parts of a dimethylvinylsiloxy-terminated polydimethylsiloxane having an average degree of polymerization of about 130 and a viscosity of about 300 millipascal-seconds, 4.5 parts of a trimethylsiloxy-terminated polydimethylsiloxane-polymethylhydrogensiloxane copolymer having a total average degree of polymerization of about 40 with about 70 mol % methylhydrogen moiety on the siloxane chain; and 0.1 parts of bis(2-methoxy-1-methylethyl) maleate.

(c) A control coating was run at the identical line speed and was identical to the silicone coating described above except it contained no silicone mist suppressant. The control coating was defined as producing 100% mist. It can be seen from Table 2 that the silicone suppressant compositions of this invention significantly reduces the misting of the control coating.

TABLE 2

| Ex. # | wt. % silicone mist suppressant in silicone coating | Line Speed (a) | % Mist Particles (b) versus Control (c) |
|---|---|---|---|
| 1 | 0.5% | 2000 feet/min | 37% |
|   | 2.0% | 2000 feet/min | 32% |
| 2 | 0.5% | 2000 feet/min | 34% |
|   | 2.0% | 2000 feet/min | 29% |
| 3 | 0.5% | 2000 feet/min | 42% |
|   | 1.0% | 1500 feet/min | 17% |
| 4 | 0.5% | 2000 feet/min | 25% |
|   | 1.0% | 1500 feet/min | 10% |
| 5 | 0.5% | 2000 feet/min | 27% |
|   | 1.0% | 1500 feet/min | 10% |
| 6 | 0.5% | 2000 feet/min | 34% |
| 7 | 1.0% | 2000 feet/min | 30% |
|   | 2.0% | 2000 feet/min | 27% |

EXAMPLES 8–13

A methylhydrogensiloxane (A), an alkenyl siloxane (B), an unsaturated organic compound (C), and catalyst (D) were thoroughly mixed at 25° C. The mixture was then brought to the desired reaction temperature and mixed at that temperature for a time sufficient to completely react all vinyl groups and for the viscosity to stabilize. Upon completion of the reaction, an inhibitor (E) was added to inhibit the activity of the catalyst and stabilize the product. Table 3 summarizes the reagents used, reaction conditions, and viscosity (in millipascal-seconds (mPa-s)) of the final products. The silicone mist suppressant compositions were then tested as described in Examples 1–7 where (a), (b), the silicone coating, and (c) are as described in Examples 1–7 above, except that (b) was measured using a Model PC-2 Ten Stage QCM Cascade Impactor™, manufactured by California Measurements Inc. instead of the Model 3225 Aerosizer DSP instrument, manufactured by TSI Corporation used in Examples 1–7. Table 4 summarizes the mist suppression performance of the silicone mist suppressants. The control coating was defined as producing 100% mist. It can be seen from Table 4 that the silicone suppressant compositions of this invention significantly reduces the misting of the control coating.

In Table 3 hereinbelow:

(A-1) denotes a trimethylsiloxy-terminated polydimethylsiloxane-polymethylhydrogensiloxane copolymer having a total average degree of polymerization of about 10 with about 50 mol % methylhydrogen moiety on the siloxane chain and a viscosity of about 5 millipascal-seconds.

(A-2) denotes a trimethylsiloxy-terminated polydimethylsiloxane-polymethylhydrogensiloxane

TABLE 1

| Ex. # | Wt. Parts of (A) | Type and Wt. parts of (B) | SiH:Vi Ratio | Wt. Parts of (C) | Reaction A Temp./Time | Type and Wt. Parts of (D) | Reaction A Temp./Time | Wt. Parts of (E) | Final Viscosity (mPa · s) |
|---|---|---|---|---|---|---|---|---|---|
| 1 | 52.0 | B-1 47.8 | 40.9:1 | 0.0047 | 25° C./18 hrs | — | — | 0.12 | 1500 |
| 2 | 50.0 | B-1 50.0 | 37.6:1 | 0.0041 | 25° C./18 hrs | — | — | 0.10 | 4040 |
| 3 | 78.4 | B-2 21.2 | 10.1:1 | 0.16 | 25° C./18 hrs | — | — | 0.31 | 850 |
| 4 | 76.3 | B-3 23.3 | 62.2:1 | 0.15 | 25° C./18 hrs | — | — | 0.31 | 695 |
| 5 | 82.2 | B-4 17.3 | 85.7:1 | 0.16 | 25° C./18 hrs | — | — | 0.33 | 430 |
| 6 | 40.0 | B-1 40.0 | 37.6:1 | 0.023 | 33° C./1 hr | D-1 10.0<br>D-2 10.0 | 64° C./1 hr | 0.045 | 1920 |
| 7 | 48.0 | B-1 48.0 | 37.6:1 | 0.0096 | 33° C./0.5 hr, 80° C./1 hr | D-1 2.0<br>D-2 2.0 | 80° C./1 hr | 0.019 | 3600 | copolymer having a total average degree of polymerization of about 40 with about 70 mol % methylhydrogen moiety on the siloxane chain and a viscosity of about 30 millipascal-seconds.

(A-3) denotes a trimethylsiloxy-terminated polymethylhydrogensiloxane polymer a total average degree of polymerization of about 40 and a viscosity of about 30 millipascal-seconds.

(B-1) denotes divinyltetramethyldisiloxane.

(B-2) denotes a dimethylvinylsiloxy-terminated polydimethylsiloxane polymer an average degree of polymerization of about 130 and a viscosity of about 300 millipascal-seconds.

(B-3) denotes tetramethyltetravinylcyclotetrasiloxane.

(B-4) denotes 1,5-hexadiene.

(C-1) denotes 1-octadecene.

(C-2) denotes a polypropylene oxide polymer, terminated on one end with a methoxy end group and on the other end with a 2-propenyloxy group.

(C-3) denotes a polyethylene oxide polymer having a degree of polymerization of terminated on one end with an acetoxy group and on the other end with a 2-propenyloxy group.

(D) denotes a soluble platinum complex containing 0.67 wt. % platinum, formed chloroplatinic acid and divinyltetramethyldisiloxane.

(E) denotes bis(2-methoxy-1-methylethyl) maleate.

and for the viscosity to stabilize. Upon completion of the reaction, an inhibitor (E) was added to inhibit the activity of the catalyst and stabilize the product. Table 5 summarizes the reagents used, reaction conditions, and viscosity (in millipascal-seconds (mPa-s)) of the final products. The silicone mist suppressant compositions were then tested as described in Examples 1–7 where (a), (b), the silicone coating, and (c) are as described in Examples 1–7 above, except that (b) was measured using a Model PC-2 Ten Stage QCM Cascade Impactor™, manufactured by California Measurements Inc. instead of the Model 3225 Aerosizer DSP instrument, manufactured by TSI Corporation used in Examples 1–7. Table 6 summarizes the mist suppression performance of the silicone mist suppressants. The control coating was defined as producing 100% mist. It can be seen from Table 6 that the silicone suppressant compositions of this invention significantly reduces the misting of the control coating.

In Table 5 hereinbelow:

(A-1) denotes a trimethylsiloxy-terminated polydimethylsiloxane-polymethylhydrogensiloxane copolymer having a total average degree of polymerization of about 10 with about 50 mol % methylhydrogen moiety on the siloxane chain and a viscosity of about 5 millipascal-seconds.

(A-2) denotes a trimethylsiloxy-terminated polymethylhydrogensiloxane polymer having a total average degree of polymerization of about 40 and a viscosity of about 30 millipascal-seconds.

TABLE 3

| Ex. # | Type and Wt. Parts of (A) | Type and Wt. parts of (B) | SiH:Vi Ratio | Type and Wt. Parts of (C) | Wt. Parts of (D) | Reaction Temp./Time | Wt. Parts of (E) | Final Viscosity (mPa · s) |
|---|---|---|---|---|---|---|---|---|
| 8 | A-1 72.0 | B-1 7.8 | 6.7:1 | C-1 11.0<br>C-2 9.0 | 0.06 | 80° C./2 hr | 0.12 | 200 |
| 9 | A-1 75.0 | B-3 5.0 | 10.1:1 | C-1 11.0<br>C-2 9.0 | 0.10 | 100° C./3 hr | 0.20 | 75 |
| 10 | A-2 75.8 | B-1 4.1 | 18.2:1 | C-1 11.0<br>C-2 9.0 | 0.10 | 80° C./2 hr | 0.20 | 252 |
| 11 | A-1 71.0 | B-1 11.0 | 4.7:1 | C-1 9.8<br>C-2 8.2 | 0.10 | 80° C./2 hr | 0.20 | 350 |
| 12 | A-3 50.0 | B-2 24.0 | 159:1 | C-1 11.0<br>C-2 9.0 | 0.10 | 80° C./2 hr | 0.20 | 170 |
| 13 | A-1 76.0 | B-4 4.9 | 5.0:1 | C-1 10.6<br>C-3 11.3 | 0.20 | 80° C./1 hr | 0.40 | 190 |

TABLE 4

| Ex. # | wt. % silicone mist suppressant in silicone coating | Line Speed (a) | % silicone mist (b) versus Control (c) |
|---|---|---|---|
| 8 | 2.0% | 1500 feet/min | 77% |
| 9 | 2.0% | 1500 feet/min | 29% |
| 10 | 2.0% | 1500 feet/min | 84% |
| 11 | 2.0% | 1500 feet/min | 10% |
| 12 | 2.0% | 1500 feet/min | 41% |
| 13 | 2.0% | 1500 feet/min | 67% |

EXAMPLES 14–19

A methylhydrogensiloxane (A), an alkenyl siloxane (B), an unsaturated organic compound (C), and catalyst (D) were thoroughly mixed at 25° C. The mixture was then brought to the desired reaction temperature and mixed at that temperature for a time sufficient to completely react all vinyl groups (B-1) denotes a dimethylvinylsiloxy-terminated polydimethylsiloxane polymer having an average degree of polymerization of about 5 and a viscosity of about 3 millipascal-seconds.

(B-2) denotes a dimethylvinylsiloxy-terminated polydimethylsiloxane polymer having an average degree of polymerization of about 130 and a viscosity of about 300 millipascal-seconds.

(B-3) denotes a dimethylvinylsiloxy-terminated polydimethylsiloxane polymer having an average degree of polymerization of about 9500.

(B-4) denotes a dimethylvinylsiloxy-terminated polydimethylsiloxane-polymethylvinylsiloxane copolymer having a total average degree of polymerization of about 100 with about 1 mol % methylvinyl moiety on the siloxane chain and a viscosity of about 230 millipascal-seconds.

(C-1) denotes 1-octadecene.

(C-2) denotes alpha-methylstyrene.

(D) denotes a soluble platinum complex containing 0.67 wt. % platinum, formed from chloroplatinic acid and divinyltetramethyldisiloxane.

(E) denotes bis(2-methoxy-1-methylethyl)maleate.

TABLE 5

| Ex. # | Wt. Parts and Type of (A) | Wt. Parts and Type of (B) | SiH:Vi Ratio | Wt. Parts and Type of (C) | Wt. Parts of (D) | Reaction Temp./Time | Wt. Parts of (E) | Final Viscosity (mPa · s) |
|---|---|---|---|---|---|---|---|---|
| 14 | A-1 59.7 | B-1 21.0 | 7.7:1 | C-1 10.9<br>C-2 8.4 | 0.05 | 80° C./1 hr | 0.10 | 750 |
| 15 | A-2 59.1 | B-2 20.6 | 219:1 | C-1 10.6<br>C-2 9.7 | 0.05 | 100° C./1 hr | 0.10 | 1130 |
| 16 | A-1 70.0 | B-3 10.0 | 12285:1 | C-2 20.0 | 0.05 | 100° C./1 hr | 0.10 | — |
| 17 | A-1 56.8 | B-4 29.1 | 37.0:1 | C-2 14.0 | 0.05 | 100° C./1 hr | 0.10 | 2710 |
| 18 | A-1 56.0 | B-4 30.2 | 30.2:1 | C-2 13.8 | 0.05 | 100° C./1 hr | 0.10 | 848 |
| 19 | A-1 46.1 | B-4 23.9 | 36.6:1 | C-2 30.0 | 0.05 | 100° C./1 hr | 0.10 | 700 |

TABLE 6

| Ex. # | wt. % silicone mist suppressant in silicone coating | Line Speed (a) | % mist particles (b) versus Control (c) |
|---|---|---|---|
| 14 | 2.0% | 1500 feet/min | 5% |
|  | 2.0% | 2000 feet/min | 10% |
| 15 | 0.5% | 2000 feet/min | 21% |
| 16 | 0.5% | 2000 feet/min | 30% |
| 17 | 0.5% | 2000 feet/min | 23% |
| 18 | 0.5% | 2000 feet/min | 51% |
| 19 | 0.5% | 2000 feet/min | 49% |

What is claimed is:

1. A silicone coating composition comprising:

(A) a solventless silicone coating composition selected from compositions comprising (A')(i) an organosilicon compound containing at least two silicon-bonded alkenyl groups per molecule, (ii) an organohydrogensilicon compound containing at least two silicon-bonded hydrogen atoms per molecule, (iii) a platinum group metal-containing catalyst, and (iv) an inhibitor, or (A")(I) an organosilicon compound having at least two groups selected from the group consisting of epoxy groups, vinyl ether groups, acrylamide groups, and acrylate groups; and (II) an initiator; and (B) a liquid silicone mist suppressant composition having a viscosity of from 150 to 50,000 millipascal-seconds (mPa.s) (1 millipascal-second=1 centipoise) obtained by a method comprising mixing: (a) at least one organohydrogensilicon compound containing at least three silicon-bonded hydrogen groups per molecule; (b) at least one compound containing at least two alkenyl groups per molecule; and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1.

2. A composition according to claim 1, wherein the solventless silicone coating composition is selected from (A'), wherein (A') comprises (i) an organosilicon compound containing at least two silicon-bonded alkenyl groups per molecule; (ii) an organohydrogensilicon compound containing at least two silicon-bonded hydrogen atoms per molecule, the ratio of the number of silicon-bonded hydrogen atoms of (ii) to the number of silicon-bonded alkenyl groups of (i) is from 0.5:1 to 4.5: 1, (iii) a platinum group metal-containing catalyst; and (iv) an inhibitor.

3. A composition according to claim 1, wherein the solventless silicone coating composition is selected from (A'), wherein (A') is obtained by a method comprising mixing (i) an organosilicon compound containing at least two silicon-bonded alkenyl groups per molecule; (ii) an organohydrogensilicon compound containing at least two silicon-bonded hydrogen atoms per molecule, the ratio of the number of silicon-bonded hydrogen atoms of (ii) to the number of silicon-bonded alkenyl groups of (i) is from 0.5:1 to 4.5: 1, (iii) a platinum group metal-containing catalyst; and (iv) an inhibitor.

4. A composition according to claim 2, wherein the ratio of the number of silicon-bonded hydrogen atoms of (ii) to the number of silicon-bonded alkenyl groups of (i) is from 0.5:1 to 3:1.

5. A composition according to claim 3, wherein the ratio of the number of silicon-bonded hydrogen atoms of (ii) to the number of silicon-bonded alkenyl groups of (i) is from 0.5:1 to 3:1.

6. A composition according to claim 4, wherein (iii) is a platinum-containing catalyst present in an amount sufficient to provide 30 to 500 weight parts of platinum for every one million weight parts of Components (i)+(ii).

7. A composition according to claim 4, wherein (iii) is a platinum-containing catalyst present in an amount sufficient to provide 30 to 250 weight parts of platinum for every one million weight parts of Components (i)+(ii).

8. A composition according to claim 5, wherein (iii) is a platinum-containing catalyst present in an amount sufficient to provide 30 to 500 weight parts of platinum for every one million weight parts of Components (i)+(ii).

9. A composition according to claim 5, wherein (iii) is a platinum-containing catalyst present in an amount sufficient to provide 30 to 250 weight parts of platinum for every one million weight parts of Components (i)+(ii).

10. A composition according to claim 3, wherein the method further comprises heating the product obtained by mixing components (i), (ii), (iii), and (iv) to a temperature of from 50° C. to 120° C.

11. A composition according to claim 1, wherein the ratio of the number of silicon-bonded hydrogen atoms of Component (a) to the number of alkenyl groups of Component (b) is from 4.6:1 to 500:1.

12. A composition according to claim 2, wherein the ratio of the number of silicon-bonded hydrogen atoms of Component (a) to the number of alkenyl groups of Component (b) is from 4.6:1 to 500:1.

13. A composition according to claim 3, wherein the ratio of the number of silicon-bonded hydrogen atoms of Component (a) to the number of alkenyl groups of Component (b) is from 4.6:1 to 500:1.

14. A composition according to claim 4, wherein the ratio of the number of silicon-bonded hydrogen atoms of Component (a) to the number of alkenyl groups of Component (b) is from 4.6:1 to 500: 1.

15. A composition according to claim 5, wherein the ratio of the number of silicon-bonded hydrogen atoms of Component (a) to the number of alkenyl groups of Component (b) is from 4.6:1 to 500:1.

16. A composition according to claim 1, wherein (c) is a platinum-containing catalyst present in an amount sufficient to provide 0.1 to 5 weight parts of platinum for every one million weight parts of Components (a)+(b).

17. A composition according to claim 6, wherein (c) is a platinum-containing catalyst present in an amount sufficient to provide 0.1 to 5 weight parts of platinum for every one million weight parts of Components (a)+(b).

18. A composition according to claim 7, wherein (c) is a platinum-containing catalyst present in an amount sufficient to provide 0.1 to 5 weight parts of platinum for every one million weight parts of Components (a)+(b).

19. A composition according to claim 8, wherein (c) is a platinum-containing catalyst present in an amount sufficient to provide 0.1 to 5 weight parts of platinum for every one million weight parts of Components (a)+(b).

20. A composition according to claim 9, wherein (c) is a platinum-containing catalyst present in an amount sufficient to provide 0.1 to 5 weight parts of platinum for every one million weight parts of Components (a)+(b).

21. A composition according to claim 1, wherein the method of obtaining the silicone mist suppressant composition further comprises adding (d) an inhibitor after mixing (a), (b), and (c).

22. A composition according to claim 1, wherein the method of obtaining the silicone mist suppressant composition further comprises adding (e) at least one compound containing one alkenyl group during or after mixing (a), (b), and (c).

23. A composition according to claim 21, wherein the method of obtaining the silicone mist suppressant composition further comprises adding (e) at least one compound containing one alkenyl group during or after mixing (a), (b), and (c).

24. A composition according to claim 22, wherein (e) is selected from the group consisting of styrene, alpha-methyl styrene, alkenyl-terminated polyoxyethylene polymers, alkenyl-terminated polyoxypropylene polymers, alkenyl-terminated polyoxyethylene-polyoxypropylene copolymers, ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, and 3-methyl-1-pentene and 3-methyl-1-butene.

25. A composition according to claim 23, wherein (e) is selected from the group consisting of styrene, alpha-methyl styrene, alkenyl-terminated polyoxyethylene polymers, alkenyl-terminated polyoxypropylene polymers, alkenyl-terminated polyoxyethylene-polyoxypropylene copolymers, ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, and 3-methyl-1-butene.

26. A composition according to claim 1, wherein the method of obtaining the silicone mist suppressant composition further comprises heating the product obtained by mixing (a), (b), and (c) to a temperature of from 25° C. to 150° C.

27. A composition according to claim 21, wherein the method of obtaining the silicone mist suppressant composition further comprises heating the product obtained by mixing (a), (b), and (c) to a temperature of from 25° C. to 150° C.

28. A composition according to claim 4, wherein
(i) is selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 50 to 300 and a viscosity at 25° C. of from 80 to 1,000 millipascal-seconds; and
(ii) is selected from the group consisting of dimethylhydrogensiloxy-terminated polydimethylsiloxane polymers, dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 5 to 100 and a viscosity at 25° C. of from 5 to 100 millipascal-seconds.

29. A composition according to claim 5, wherein
(i) is selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 50 to 300 and a viscosity at 25° C. of from 80 to 1,000 millipascal-seconds; and
(ii) is selected from the group consisting of dimethylhydrogensiloxy-terminated polydimethylsiloxane polymers, dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 5 to 100 and a viscosity at 25° C. of from 5 to 100 millipascal-seconds.

30. A composition according to claim 6, wherein (iii) is chloroplatinic acid or a platinum-containing catalyst which is obtained by a method comprising reacting chloroplatinic acid with divinyltetramethyldisiloxane.

31. A composition according to claim 7, wherein (iii) is chloroplatinic acid or a platinum-containing catalyst which is obtained by a method comprising reacting chloroplatinic acid with divinyltetramethyldisiloxane.

32. A composition according to claim 8, wherein (iii) is chloroplatinic acid or a platinum-containing catalyst which is obtained by a method comprising reacting chloroplatinic acid with divinyltetramethyldisiloxane.

33. A composition according to claim 9, wherein (iii) is chloroplatinic acid or a platinum-containing catalyst which is obtained by a method comprising reacting chloroplatinic acid with divinyltetramethyldisiloxane.

34. A composition according to claim 11, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

35. A composition according to claim 12, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

36. A composition according to claim 13, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

37. A composition according to claim 14, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

38. A composition according to claim 15, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and aviscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

39. A composition according to claim 16, wherein
(a) is selected from the group consisting of dimethylhydrogensiloxy-terminated polymethylhydrogensiloxane polymers, dimethylhydrogensiloxy-terminated polydimethylsiloxane-polymethylhydrogensiloxane copolymers, trimethylsiloxy-terminated polydimethylsiloxane-polymethylhydrogensiloxane copolymers, and trimethylsiloxy-terminated polymethylhydrogensiloxane polymers, each having a degree of polymerization of from 3 to 100, and a viscosity at 25° C. of from 1 to 200 millipascal-seconds; and
(b) is selected from the group consisting of divinyltetramethyldisiloxane, tetramethyltetravinylcyclotetrasiloxane, trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, trimethylsiloxy-terminated polymethylvinylsiloxane polymers, trimethylsiloxy-terminated polymethylhexenylsiloxane polymers, vinyldimethylsiloxy-terminated polydimethylsiloxane polymers, and hexenyldimethylsiloxy-terminated polydimethylsiloxane polymers, each having a degree of polymerization of from 2 to 1,000, and a viscosity at 25° C. of from 0.5 to 10,000 millipascal-seconds.

40. A composition according to claim 17, wherein (c) is chloroplatinic acid or a platinum-containing catalyst which is obtained by a method comprising reacting chloroplatinic acid with divinyltetramethyldisiloxane.

41. A composition according to claim 18, wherein (c) is chloroplatinic acid or a platinum-containing catalyst which is obtained by a method comprising reacting chloroplatinic acid with divinyltetramethyldisiloxane.

42. A composition according to claim 19, wherein (c) is chloroplatinic acid or a platinum-containing catalyst which is obtained by a method comprising reacting chloroplatinic acid with divinyltetramethyldisiloxane.

43. A composition according to claim 20, wherein (c) is chloroplatinic acid or a platinum-containing catalyst which is obtained by a method comprising reacting chloroplatinic acid with divinyltetramethyldisiloxane.

44. A composition according to claim 2, wherein (iv) is selected from the group consisting of 1-ethynyl-1-cyclohexanol, 2-methyl-3-butyn-2-ol, 2-phenyl-3-butyn-2-ol, 3,5-dimethyl-1-hexyn-3-ol, trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, ((1,1-dimethyl-2-propynyl)oxy)trimethylsilane, diallyl maleate, dimethyl maleate, bis-(methoxyisopropyl) maleate, 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, 3-phenyl-3-butene-1-yne, 1,3,5,7-tetramethyl-1,3,5,7-tetravinylcyclotetrasiloxane, and a mixture of a conjugated ene-yne and a vinylcyclosiloxane.

45. A composition according to claim 3, wherein (iv) is selected from the group consisting of 1-ethynyl-1-cyclohexanol, 2-methyl-3-butyn-2-ol, 2-phenyl-3-butyn-2-ol, 3,5-dimethyl-1-hexyn-3-ol, trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, ((1,1-dimethyl-2-propynyl)oxy)trimethylsilane, diallyl maleate, dimethyl maleate, bis-(methoxyisopropyl) maleate, 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, 3-phenyl-3-butene-1-yne, 1,3,5,7-tetramethyl-1,3,5,7-tetravinylcyclotetrasiloxane, and a mixture of a conjugated ene-yne and a vinylcyclosiloxane.

46. A composition according to claim 21, wherein (d) is selected from the group consisting of 1-ethynyl-1-cyclohexanol, 2-methyl-3-butyn-2-ol, 2-phenyl-3-butyn-2-ol, 3,5-dimethyl-1-hexyn-3-ol, trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, ((1,1-dimethyl-2-propynyl)oxy)trimethylsilane, diallyl maleate, dimethyl maleate, bis-(methoxyisopropyl) maleate, 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, 3-phenyl-3-butene-1-yne, 1,3,5,7-tetramethyl-1,3,5,7-tetravinylcyclotetrasiloxane, and a mixture of a conjugated ene-yne and a vinylcyclosiloxane.

47. A silicone coating composition comprising:
(A) at least one organosilicon compound containing at least two silicon-bonded alkenyl groups per molecule;
(B) a liquid silicone mist suppressant composition having a viscosity of from 150 to 50,000 millipascal-seconds (mPa.s) (1 millipascal-second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum group metal per million weight parts of (a)+(b), with the proviso that the ratio of the number of silicon-bonded hydrogen atoms of Component (a) to the number of alkenyl groups of Component (b) is at least 4.6:1; and (C) an inhibitor.

48. A silicone coating composition comprising:

(A) an organohydrogensilicon compound containing at least two silicon-bonded hydrogen atoms per molecule; and (B) a liquid silicone mist suppressant composition having a viscosity of from 150 to 50,000 millipascal-seconds (mPa.s) (1 millipascal-second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum per million weight parts of (a)+(b), with the proviso that the ratio of the number of silicon-bonded hydrogen atoms of Component (a) to the number of alkenyl groups of Component (b) is at least 4.6:1.

49. A composition according to claim 48, wherein the composition further comprises (C) an inhibitor.

50. A method of reducing mist in a silicone coating composition comprising adding to a solventless silicone coating composition a liquid silicone mist suppressant composition having a viscosity of from 150 to 50,000 millipascal-seconds (1 millipascal second=1 centipoise) obtained by a method comprising mixing: (a) at least one organohydrogensilicon compound containing at least three silicon-bonded hydrogen groups per molecule, (b) at least one compound containing at least two alkenyl groups per molecule, and (c) a platinum group metal-containing catalyst which is present in an amount sufficient to provide 0.1 to 10 weight parts of platinum per million weight parts of (a)+(b), with the proviso that the ratio of the number of silicon-bonded hydrogen atoms of Component (a) to the number of alkenyl groups of Component (b) is at least 4.6:1.

51. A composition according to claim 2, wherein the solventless silicone coating composition further comprises (v) a bath life extender compound.

52. A composition according to claim 2, wherein the solventless silicone coating composition further comprises (vi) a release additive.

* * * * *